United States Patent [19]

Sugimoto et al.

[11] Patent Number: 4,942,771
[45] Date of Patent: Jul. 24, 1990

[54] MAGNETOSTRICTION TYPE TORQUE SENSOR

[75] Inventors: Masaki Sugimoto, Yokosuka; Kunihiko Morikawa, Fujisawa; Nobuteru Hitomi, Yokohama; Kenji Ikeura, Zushi; Hisashi Kitahara, Yokosuka; Hiroyuki Hirano, Fujisawa; Kazuhiro Takatori, Yokosuka, all of Japan

[73] Assignee: Nissan Motor Co., Ltd., Yokohama, Japan

[21] Appl. No.: 206,722

[22] Filed: Jun. 15, 1988

[30] Foreign Application Priority Data

Jun. 15, 1987 [JP] Japan .................. 62-148285
Jun. 15, 1987 [JP] Japan .................. 62-148286

[51] Int. Cl.$^5$ .............................. G01L 3/10
[52] U.S. Cl. .................................. 73/862.36
[58] Field of Search .............. 73/862.36, DIG. 2

[56] References Cited

U.S. PATENT DOCUMENTS

| 4,275,694 | 6/1981 | Nagaishi . |
| 4,332,226 | 6/1982 | Nomura et al. . |
| 4,506,554 | 3/1985 | Blomkust ............ 73/862.36 |
| 4,549,516 | 10/1985 | Koumura . |
| 4,823,620 | 4/1989 | Edo et al. ............ 73/862.36 |

FOREIGN PATENT DOCUMENTS

| 2939013 | 4/1980 | Fed. Rep. of Germany . |
| 2939620 | 4/1981 | Fed. Rep. of Germany . |
| 3045997 | 9/1981 | Fed. Rep. of Germany . |
| 3438465 | 5/1985 | Fed. Rep. of Germany . |
| 3509552 | 9/1986 | Fed. Rep. of Germany . |
| 3704049 | 8/1987 | Fed. Rep. of Germany ... 73/862.36 |
| 57-211030 | 12/1982 | Japan . |
| 59-77326 | 5/1984 | Japan . |
| 59-164931 | 9/1984 | Japan . |
| 60-44839 | 3/1985 | Japan . |
| 61-127952 | 6/1986 | Japan . |
| 61-127953 | 6/1986 | Japan . |
| 838448 | 12/1977 | U.S.S.R. . |
| 667836 | 6/1979 | U.S.S.R. ................ 73/862.36 |

OTHER PUBLICATIONS

MTZ Motortechnisch Zeitschrift 47, p. 179 (1986).

*Primary Examiner*—Charles A. Ruehl
*Attorney, Agent, or Firm*—Foley & Lardner, Schwartz, Jeffery, Schwaab, Mack, Blumenthal & Evans

[57] ABSTRACT

First and second sets of grooves define first and second sets of elongate projections which are respectively subject to compression and elongation when the shaft in which they are defined, is subject to torque. Two yoked coils which are excited with an alternating current, are each disposed close to a set of projections. The compression and elongation of the projections changes the amount of magnetic flux which flows along the projections and therefore the inductance of the coils. The coils form part of a bridge circuit which is sensitive to the change in inductance in a manner which enables the amount of torque to be measured.

6 Claims, 8 Drawing Sheets

MAGNETOSTRICTION TYPE TORQUE SENSOR

BACKGROUND OF THE INVENTION

1. Field of the Invention

The present invention relates to torque sensors and more specifically to a torque sensor, of the type which can detect the torque applied to a rotating body or the like, without direct connection or contact therewith and which type of sensor makes use of the so called magnetostriction phenomenon.

2. Description of the Prior Art

JP-A-61-127952 and JP-A-61-127953 disclose previously proposed torque sensors of the type which are front of contact with the rotating body in which the torque is being measured. In these prior art arrangements, one or more sensor elements are disposed about the rotating body in a transmission case and secured to rib flanges or the like of the casing by way of screws or the like.

These sensor arrangements are arranged to project from their mounting sites and juxtapose the peripheral outer surface of the shaft in which torque is to be sensed and to include U shape cores on which exciting and measuring coils are wound.

However, these devices have suffered from the drawback that as they are exposed to only a portion of the rotating shafts they tend to be subject to "eccentricity" noise which is generated when the shaft is subject to the application of torque which induces twisting deformation and causes the portion of the shaft to which the sensor is exposed to become momentarily eccentric.

A further drawback comes in that the voltage output signal of the device is relatively low. To overcome this it is necessary to increase the number of windings on the sensing and exciting coils. However, this measure results in the size of the sensor being unacceptably increased to the point wherein disposal in the confines of a transmission case becomes very difficult.

SUMMARY OF THE INVENTION

It is an object of the present invention to provide a torque sensor of the type which makes use of the so called magnetostriction phenomenon (viz., the dependance of the state of strain of a ferromagnetic sample on the direction and the extent of magnetization), which is compact and produces a signal which accurately reflects the torque being applied to a rotating body, which is compact and light and can be disposed in locations wherein space about the shaft in which it is desired to measure torque, is limited.

In brief, the above object is achieved by an arrangement wherein first and second sets of grooves define first and second sets of elongate projections which are respectively subject to compression and elongation when the shaft in which they are defined or otherwise formed is subject to torque. Two yoked coils, which are excited with an alternating current, are each disposed as close as practical to a set of projections. The compression and elongation of the projections changes the amount of magnetic flux which flows therealong and therefore effects the inductance of the coils. The coils are connected in a bridge circuit which is sensitive to the change in inductance in a manner which enables the amount of torque to be measured.

More specifically, a first embodiment of the invention takes the form of a torque sensor for sensing the torque in a rotatable body, the sensor featuring: means defining a first set of grooves in a surface of the rotatable body, the first grooves defining a plurality of first projections therebetween, the first grooves and the first projections being arranged at a first predetermined angle with respect to the axis of rotation of the rotatable body, the first projections undergoing one of compression and elongation when a torque is applied to the rotatable body; a first coil, the first coil being mounted on a first yoke which juxtaposes the first set of grooves, the first coil being operatively connected with a control circuit which includes a source of alternating current.

A second aspect of the invention is deemed to comprise a torque sensor for sensing the torque applied to a rotatable body, the sensor featuring: means defining first and second sets of grooves in the rotatable body, the first and second sets of grooves being arranged to define first and second sets of projections therebetween, the first and second sets of projections being arranged at a predetermined angle with respect to the axis of rotation of the rotatable body, the first set of projections being arranged to undergo one of compression and elongation when the a torque is applied to the rotatable body, the second set of projections being arranged to undergo the other of compression and elongation when the torque is applied to the rotatable body; first and second coils, the first and second coils being mounted on first and second yokes which respectively juxtapose the first and second sets of projections, the first and second coils being operatively connected with a control circuit which includes a source of alternating current.

A third aspect of the present invention is deemed to comprise a torque sensor for sensing the torque applied to a rotatable shaft which sensor features: means defining a coaxial bore in the shaft; means defining first and second sets of grooves in the wall of the bore, the second set of grooves being arranged to define a mirror image configuration with respect to the first set, the first and second sets of grooves being arranged to define first and second sets of projections therebetween respectively, the first set of projections being arranged to undergo one of compression and elongation when a torque is applied to the rotatable body, the second set of projections being arranged to undergo the other of compression and elongation when the torque is applied to the rotatable body; a second shaft, the second shaft being supported in a manner to extend through the bore; first and second coils, the first and second coils being mounted on the second shaft, the shaft being formed with first and second yokes which are respectively associated with the first and second coils and which respectively juxtapose the first and second sets of projections, the first and second coils being operatively connected with a control circuit which includes a source of alternating current.

A further aspect of the present invention is deemed to comprise a torque sensor for sensing the torque applied to a rotatable shaft, the sensor featuring: means defining a coaxial bore in the shaft; means defining a first set of grooves in the wall of the bore; means defining a second set of grooves on the external peripheral surface of the shaft, the first and second sets of grooves being arranged to define first and second sets of projections therebetween respectively, the first set of projections being arranged to undergo one of compression and elongation when a torque is applied to the rotatable body, the second set of projections being arranged to undergo the other of compression and elongation when torque is applied to the rotatable body; a stationary shaft, the stationary shaft being stationary with respect to the rotatable shaft and supported in a manner to extend through the coaxial bore; a first coil mounted on the second shaft, the shaft being formed with a first yoke arrangement, the first yoke arrangement juxtaposing the first set of projections; second coil, the second coil being mounted on a second yoke juxtaposes the second set of projections; a control circuit, the control circuit including a source of alternating current and being operatively connected with the first and second coils.

DETAILED DESCRIPTION OF THE PREFERRED EMBODIMENTS

Figure 1:
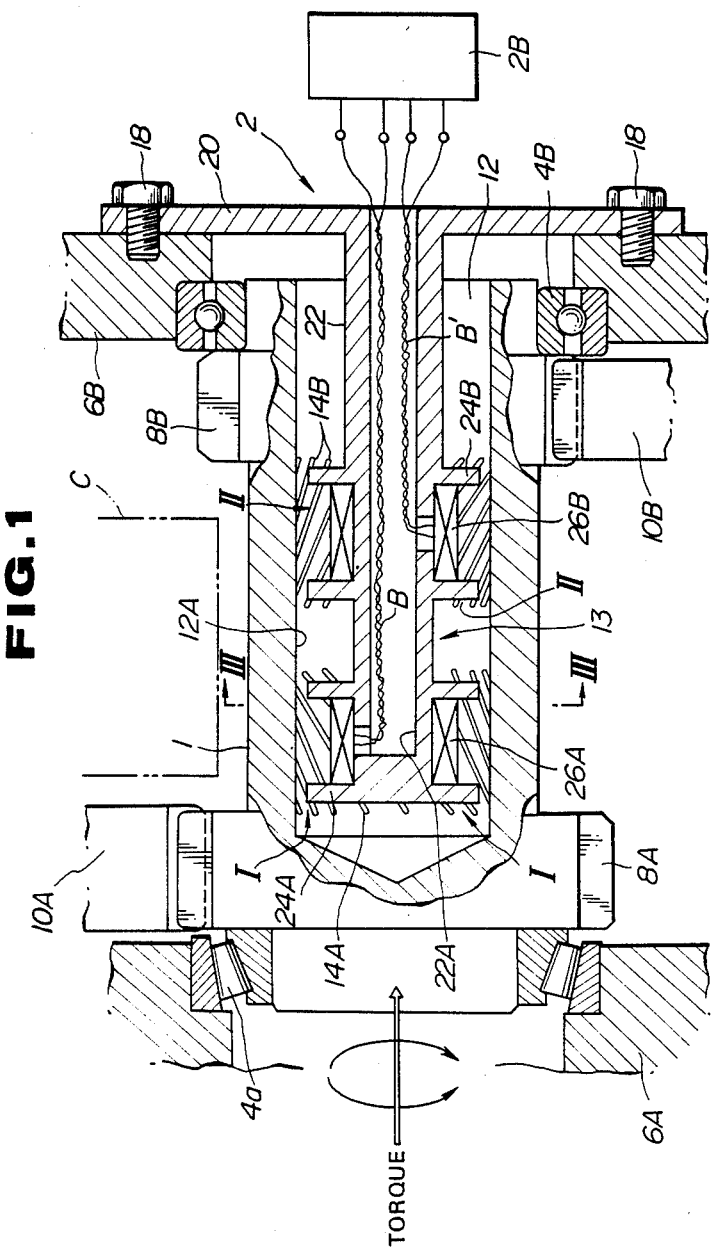
FIG. 1 of the drawings shows in sectional elevation the arrangement which characterizes a first embodiment of the present invention.

FIGS. 1 to 6 show details of a first embodiment of the present invention. In this arrangement a hollow shaft 1 made of a magnetic permeable material such as Cr-Mo alloy steel is arranged to receive a torque sensor unit generally denoted by the numeral 2, in a blind bore 12 defined therein. A taper roller bearing 4A and a ball bearing 4B are disposed in structural members 6A and 6B which are stationary relative to the shaft 1. These bearings are arranged to support the axial end portions of the shaft 1 in the illustrated manner. An input gear 8A is connected to "input end" of the shaft 1 and an output gear 8B is connected to the "output end" of the same.

The input gear 8A is arranged to mesh with a gear 10A which, is connected operatively with a source of rotational energy such as a prime mover or the like while the output gear 8B is arranged to mesh with a gear 10B which is operatively connected with a vehicle transmission arrangement or the like.

The peripheral wall of the bore 12 is formed with two sets of grooves 14A and 14B hereinafter referred to as groove sets I and II, respectively. These grooves 14A and 14B are formed in a portion of the bore wall which will be referred to as a "torque detection surface" 12A.

The torque sensor 2 further includes a radial flange or end plate member 20 which is fixed to the stationary structural member 6B by way of bolts 18; a hollow shaft member 22, which in this instance is formed integrally with the flange or end plate member 20, is supported in a manner to extend coaxially through the blind bore 12.

Figure 3:
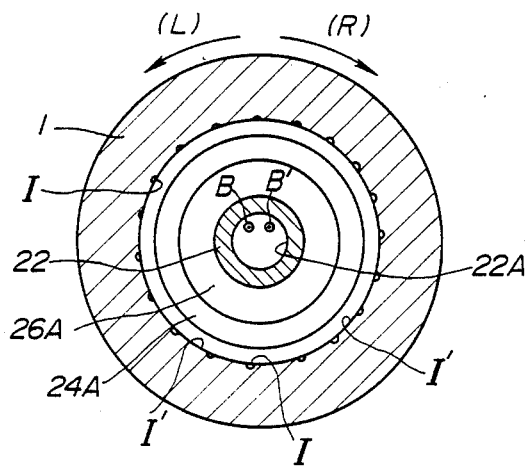
FIG. 3 is a sectional end elevation of the section taken along section line III—III of FIG. 1.

The shaft 22 includes an axial end portion which defines a main body portion 13 of the magnetostriction sensor arrangement. This portion 13 is arranged to juxtapose the torque detection surface 12A and includes a bobbin like construction on which first and second coils 26A and 26B are wound. Radial flange sections are located on either side of the coils and define yokes 24A and 24B. These yokes 24A and 24B, as shown in FIG. 3, are arranged to be coaxial with and to closely juxtapose the torque detection surface 13 in which the first and second groove groups I and II are formed, and to be spaced therefrom by a predetermined small distance. This distance is selected to be as small as practical for the purposes of reducing magnetic reluctance.

The coils 26A and 26B are arranged to communicate with a control circuit 2B by way of control lines B and B'. As shown, these control lines are both arranged to pass through a blind bore 22A defined coaxially in shaft 22.

As will be appreciated from the drawings, the first and second coils 26A and 26B are spaced by a predetermined distance and arranged so that coil 26A is located proximate the blind end of the bore 12 while coil 26B is located proximate an axial central portion thereof.

Figure 2:
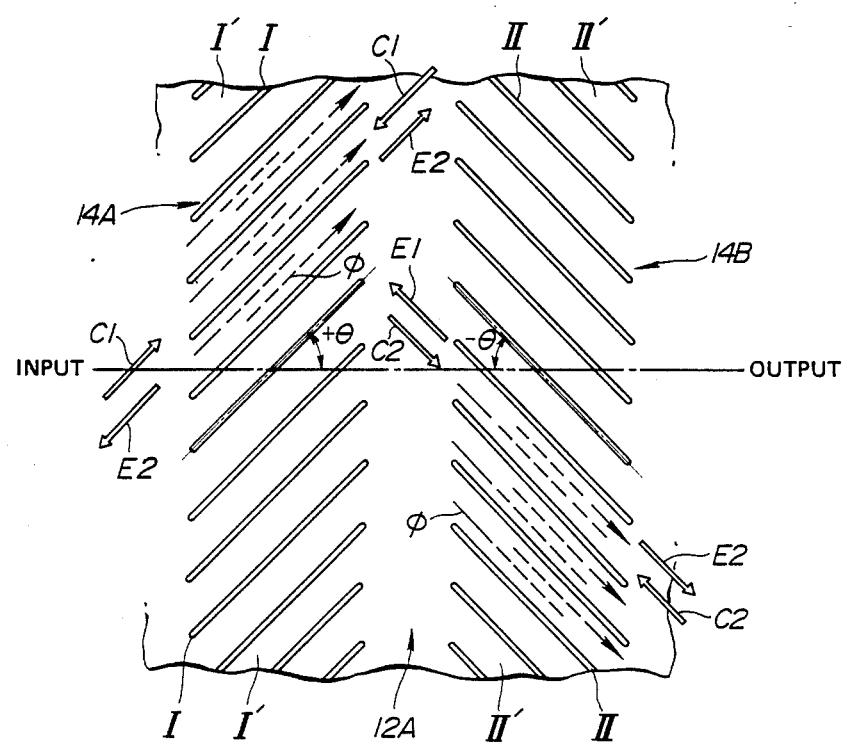
FIG. 2 is a drawing showing the groove arrangements which form a vital portion of the first embodiment.

As shown in FIG. 2, grooves 14A and 14B of the first and second groove sets I and II are arranged in a mirror image configuration with one and other and at predetermined angles +theta and −theta, respectively.

The grooves have the same predetermined depth, width and length. In this instance theta|=45° with respect to the longitudinal axis of the shaft 1.

Projection sections I' and II' are defined between the grooves. The importance of these will become more clearly appreciated hereinlater.

Figure 4:
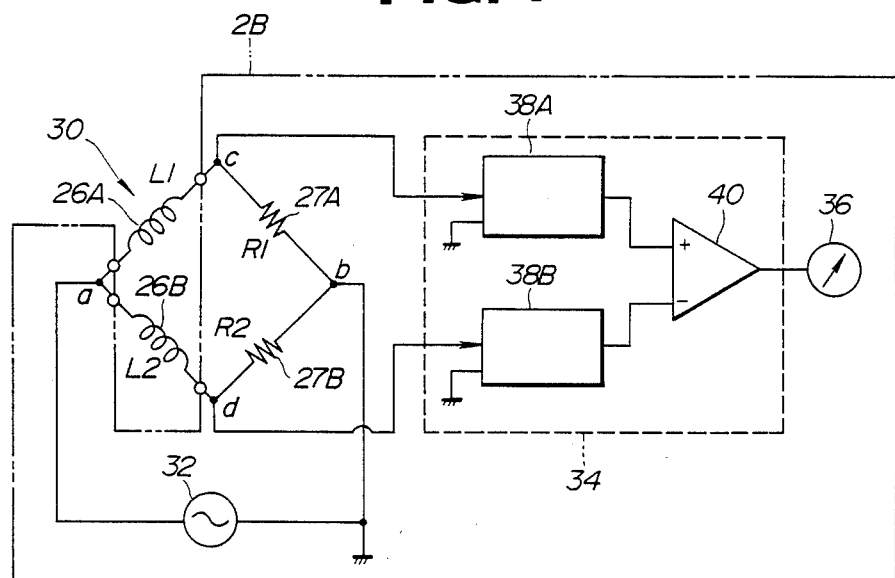
FIG. 4 is a circuit diagram showing a circuit arrangement which is used in connection with the first embodiment.
Figure 5:
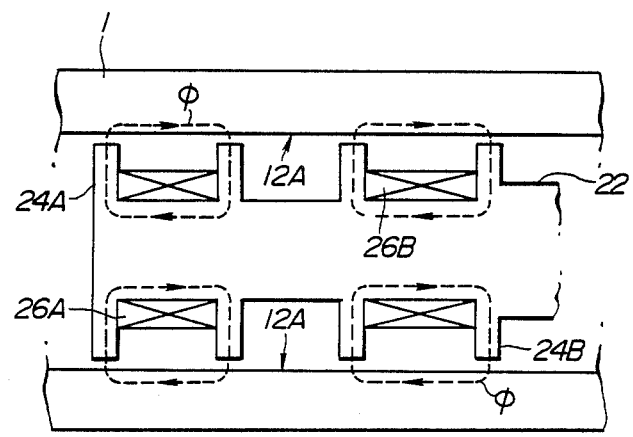
FIG. 5 is a schematic elevational view showing the magnetic circuits which are produced with the first embodiment.
Figure 6:
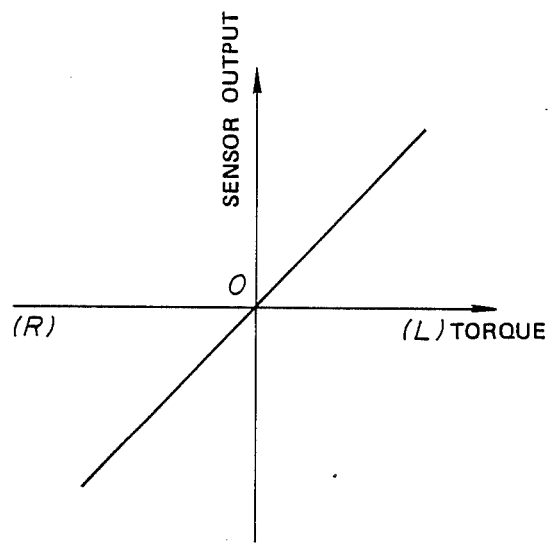
FIG. 6 is a graph showing the output characteristics of the first embodiment in terms of torque and output voltage.

FIG. 4 shows a circuit arrangement which is used in the control circuit 2B of the instant embodiment.

This circuit is such that coils 26A and 26B are circuited with resistances 27A and 27B in a manner to define a bridge circuit 30. This bridge circuit 30 has four terminals a-d. In this arrangement terminals a and b are connected across a source of alternating current 32 while terminals C and D are connected with a logic circuit 34. The alternating current source (oscillator or the like) is arranged to produce signals having a frequency of 10–30KHz The logic circuit 32 includes first and second rectifier circuits 38A, 38B and a differential amplifier 40. As shown, rectifier circuit 38A is connected to the plus input of the amplifier 40 while rectifier 38B is connected the minus input thereof. The output of the differential amplifier is supplied to a suitable device which displays or otherwise makes use of the data supplied thereto. Merely by way of example, in automotive applications, the output of the differential amplifier 40 can be supplied to a "black box" which controls the shifting of a transmission, the supply of fuel, ignition timing and the like.

In the instant embodiment the inductances L1 and L2 of the coils 26A and 26B are arranged to be equal.

The values of resistances R1 and R2 are selected to reduce the output of the bridge circuit 30 to zero under conditions wherein torque is not applied.

In operation the above described arrangement is such that when torque is not applied to the shaft 1 through the input gear 8A and the alternating current source 32 in control circuit 2B is ON, the first and second coils 26A and 26B are supplied with alternating current. Under these conditions a magnetic circuit is established in the manner by broken line in FIG. 5. Viz., in the case of coil 26A magnetic flux (phi) cycles through the radial flange members which define the yoke 24, the gaps between the yoke 24 and the shaft 1, the surface of the shaft 1 and the portion of the shaft defined between the radial flange members.

In this instance the magnetic flux (phi) undergoes a skin effect. Viz., an effect wherein alternating currents tend to flow near the surface of a conductor and thus are restricted to a small part of the total cross sectional area and produce the effect of increasing the resistance.

Under these conditions as the inductances L1 = L2 the voltages appearing on the terminals c and d of the bridge circuit 30 assume the same magnitude.

Accordingly, the differential amplifier outputs a zero level signal.

However, with the present invention due to the provision of the grooves 14A and 14B, and the occurence of the skin effect, the magnetic flux (phi) generated by the coils 26A and 26B is induced to flow along the projections I' and II' and thus establish a torque is applied to the shaft 1 the projection portions I' and II' undergo linear deformation which increases the permeability ratio thereof. Viz., in the instant embodiment, when the shaft 1 is subject to torque one set of projection portions tends to undergo elongation while the other set tends to undergo compression. The amount of magnetic flux (phi) (shown by broken lines) in the compressed projection members reduces while that in the elongated ones increases. This changes the value of the inductances L1 and L2 and induces the voltages appearing on terminals c and d to change accordingly.

By way of example, when torque applied in a manner to flow from a first end of shaft 1 to the other and cause the same to rotate in a first rotational direction, the projection portions I' are compressed (as shown by arrows Cl) the projection portions II' are elongated (as shown by arrows E1), L1 reduces while L2 increases.

This results in the balance of the bridge circuit 30 being broken in a manner wherein the c–b voltage increases as compared with the d–b voltage.

Accordingly, the strength of the signal applied to rectifier circuit 38A increases as compared with circuit 38B. The positive imbalance is converted into a signal indicative of the same by the differential amplifier 40.

Conversely, when torque is applied in a manner to flow from the second end of the shaft to the first one while rotating the same direction as in the above voltage increases as compared with the d–b voltage. example, elongation (E1-E1) and compression (C2-C2) of the projection portions I' and II' occurs with the reverse results. This of course induces the situation wherein the strength of the signal fed to rectifier circuit 38B increases as compared with that of 38A.

This negative imbalance is converted by the differential amplifier into the appropriate output signal indicative thereof.

The first embodiment exhibits a number of advantages over the prior art. Viz., as the sensor arrangement is enclosed within the blind bore 12, it inherently tends to be shielded from external influences and noise. Further, the arrangement permits noise due to eccentricity to be averaged out by the subtracting nature of the arrangement and thus greatly reduces the possibility of error due to this phenomenon.

In addition to this, production of the arrangement is simple in that it consists of only two major elements - the rotating hollow shaft 1 and the probe-like main sensor body 13 which is supported in the bore of the shaft.

While the formation of the grooves in the surface of the shaft defines the most simple and responsive arrangement, it is alternatively possible, as the invention utilizes the above mentioned skin effect, to prefabricate a separate membrane having slits which define the first and second groove sets I and II, form the same into a sleeve and bond the same in place within the blind bore.

By way of explanation, it is deemed obvious that the pair of grooves which are used in the invention are such that any deviations induced by slight stresses in the membrane or by temperature characteristics of the bond are apt to occur in both sets of grooves and thus tend to inherently cancel one another in the bridge circuit. Accordingly, no additional correction is necessary.

Further, the arrangement of grooves enables the rotational direction and/or the direction of the torque flow to be readily discerned while the internal disposure of the device renders it possible to provide gears and the like on the external surface. This of course enables highly compact, arrangements to be constructed and utilized in locations wherein space is extremely limited Viz., in locations wherein a device or structural element such as denoted by the phantom outline C is required to be disposed in close proximity of the shaft 1 by way of example.

As only two coils need be supported within the blind bore it is possible to support the relatively light main body using only the radial flange 20. This enables the device to be disposed in an automotive transmission within the main shaft of the transmission on which the output gear is supported by way of example.

Hitherto, it has been very difficult if not impossible to dispose a torque sensor in a manner wherein it juxtaposes an external surface of the shaft to provision of bearings, meshing gears and the like.

Figure 7:
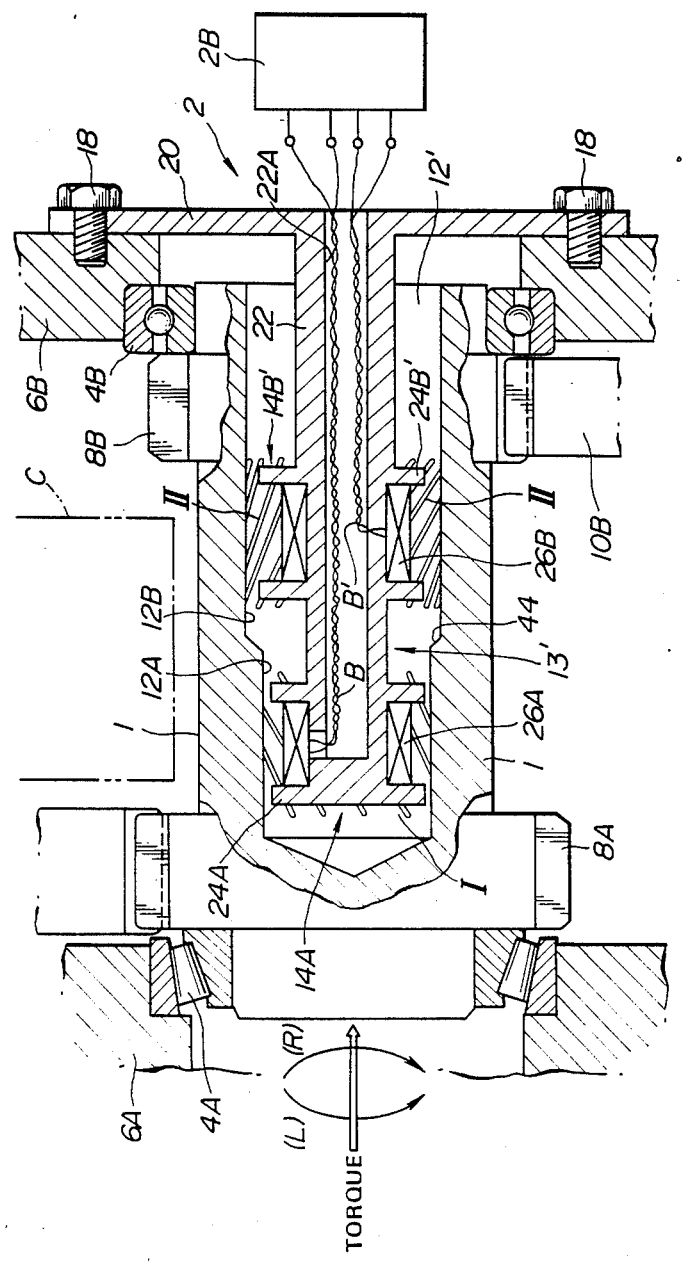
FIG. 7 is a sectional elevational view showing the arrangement of a second embodiment of the present invention.

FIG. 7 shows a second embodiment of the present invention. In this arrangement the bore 12' formed in the shaft 1 is stepped in a manner to have a small diameter portion and a large diameter portion which are separated by a step section 44. The number and arrangement of the first set of grooves 14A (viz., groove set I) is essentially the same as in the first embodiment. However, the second set or grooves 14B' are formed on a larger diameter section of the inner periphery of the bore wall. This portion of the bore wall will be referred to as torque sensing surface 12B.

In view of the increased diameter of the torque sensing surface 12B the diameter of the yokes 24B' are increased to maintain desired small clearance between the yokes and bore wall. In this embodiment the dimension of the coil 26B are essentially the same as in first embodiment.

The construction of the second embodiment changes the value of inductance L2 with the result that L1 is not equal to L2 In order to balance the bridge circuit utilized in the control section or circuit 2B, the values of resistors R1 and R2 are appropriately selected.

Other than the above changes the second embodiment is essentially same as the first one.

The provision of the step 4A in the bore in which the sensor arrangement is disposed facilitates the machining of the first set of grooves 14A and increases the ease with the device can be manufactured.

It will be noted the invention is not limited to forming the at 45° with respect to the rotational axis of the shaft and that the angle can be varied without departing from the scope thereof.

FIGS. 8 to 12 show embodiment of the present invention which adapted for use in situations wherein it is to locate the sensor in an axially compact arrangement.

In this embodiment a first set of grooves 14A are formed in the wall of blind bore 12 while the second set 14B" are formed in external peripheral surface of the shaft 1. The surface in which the grooves 14A are defined referred to as torque detecting surface 12A while that in which the external grooves 14B" are formed will be referred to as torque detecting surface 12E.

Figure 8:
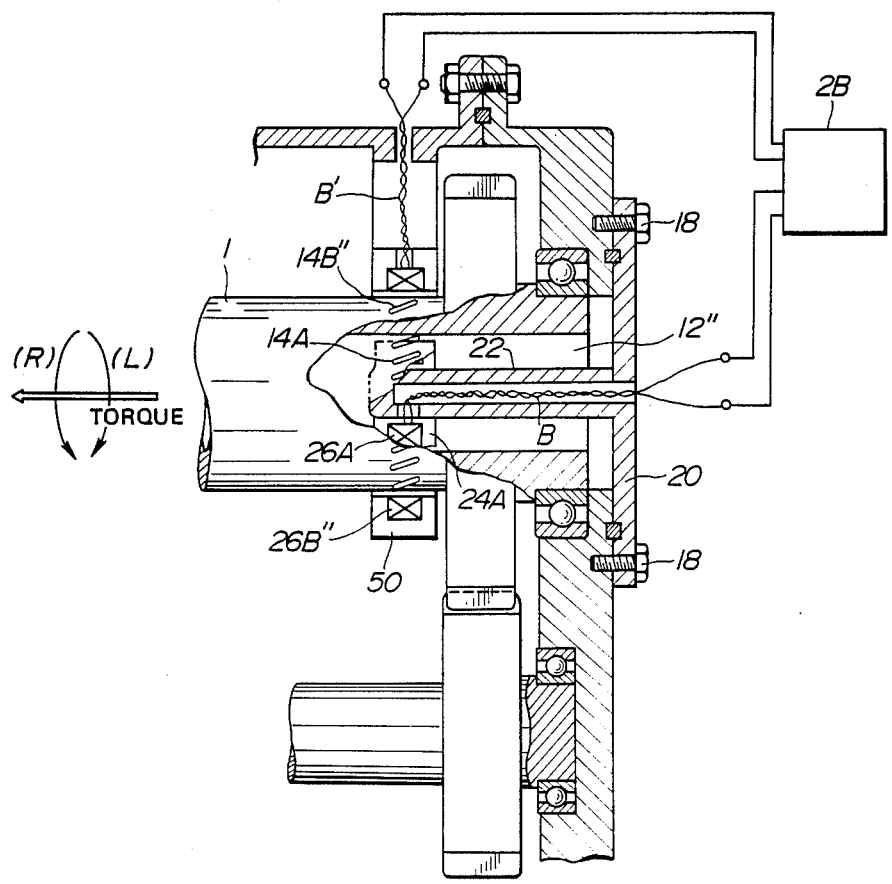
FIG. 8 is a sectional elevational view showing a third embodiment of the present invention.
Figure 9:
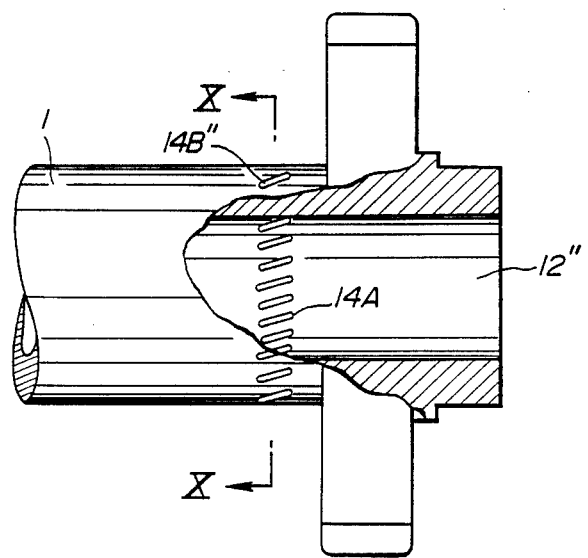
FIG. 9 is a partially sectioned elevational view showing a part of the arrangement disclosed in FIG. 8.

As will be appreciated from FIG. 8 that the grooves 14A and 14B" are arranged at essentially the same angle with respect to the rotational axis of the shaft 1. The two sets are radially aligned.

In this arrangement probe-like arrangement comprised of shaft 22 which is disposed in the blind bore 12" is provided with only one coil 26A and yoke 24A thereon. A second coil 26B" is wound on an annular body 50 which includes radially entending flanges which acts as a yoke 50A. This body 50 is secured in a manner wherein the yoke 50A juxtapose the portion of the shaft in the second set of grooves 14B" are formed.

Figure 10:
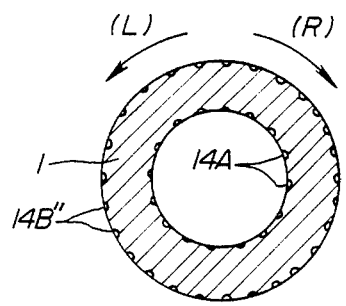
FIG. 10 is a sectional view taken along section line X—X of FIG. 9.
Figure 11:
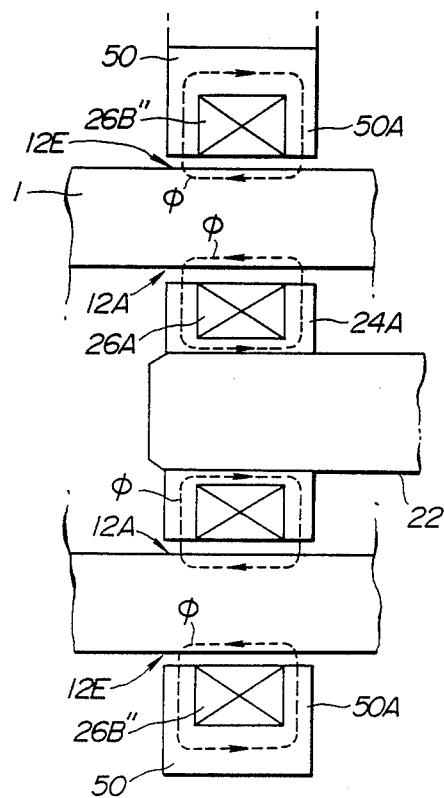
FIG. 11 is a schematic sectional view showing the magnetic circuit arrangement produced in accordance with the third embodiment.

With this arrangement, when a torque is applied to the shaft 1 which induces the same to rotate in the direction indicated by arrow R in FIG. 10 for example, the external projection portions which are defined between the grooves 14B" formed in the outer periphery of the shaft 1 are subject to compression while the corresponding internal projection portions defined on the bore wall are subject to elongation. This causes a reduction in the permeability ratio of the external projection portions while increasing the same in the internal projection portions. Accordingly, the magnetic flux (phi) which passes through the external projection portions reduces while that passing through the internal projection portions increases. This change induces a corresponding change in the values of L1 and L2 in the bridge circuit 30 utilized in the control circuit 2B in essentially the same manner as set forth in connection with the second embodiment.

It will be appreciated that the instant invention is not limited to the above disclosed embodiments and that various changes and modifications can be envisioned without departing from the spirit thereof.

What is claimed is:

1. A torque sensor for sensing the torque in a rotatable body, comprising:

means defining a first set of grooves in a surface of said rotatable body, said first grooves defining a plurality of first projections therebetween, said first grooves and said first projections being arranged at a first predetermined angle with respect to the axis of rotation of said rotatable body, said first projections undergoing one of compression and elongation when a torque is applied to said rotatable body;

a first coil, said first coil being mounted on a first yoke which juxtaposes said first set of grooves, said first coil being operatively connected with a control circuit which includes a source of alternating current;

means defining a second set of grooves in a surface of said rotatable body, said second set of grooves defining a plurality of second projections which are arranged at a second predetermined angle with respect to the axis of rotation of said rotatable body, said second projections undergoing the other of compression and elongation when said torque is applied to said rotatable body;

a second coil, said second coil being mounted on a second yoke which juxtaposes said second set of grooves, said second coil being connected with said control circuit;

wherein said first and second sets of projections are magnetically permeable and such that when subject to compression the permeability is reduced and the amount of magnetic flux which passes therethrough is reduced, and when subject to elongation the permeability is increased and the amount of magnetic flux which passes therethrough increased;

wherein said first and second sets of grooves are defined in the same surface of said rotatable body and in a manner to define a mirror image relationship;

wherein said first and second sets of grooves are defined on the wall of a bore which is formed in said rotatable body; and wherein said bore is stepped and said first set of grooves are defined on a section of said bore having a first diameter and said second set of grooves are defined on a section of said bore having a second diameter.

2. The torque sensor as claimed in claim 1, wherein said control circuit includes a bridge circuit which is operatively connected with said source of alternating current, said first and second coils defining first and second inductances of said bridge circuit, said bridge circuit further including first and second fixed resistances, said first and second fixed resistances being selected to balance said bridge circuit when no torque is applied to said rotatable body.

3. A torque sensor for sensing the torque in a rotatable body, comprising:

means defining a first set of grooves in a surface of said rotatable body, said first grooves defining a plurality of first projections therebetween, said first grooves and said first projections being arranged at a first predetermined angle with respect to the axis of rotation of said rotatable body, said first projections undergoing one of compression and elongation when a torque is applied to said rotatable body;

a first coil, said first coil being mounted on a first yoke which juxtaposes said first set of grooves, said first coil being operatively connected with a control circuit which includes a source of alternating current;

means defining a second set of grooves in a surface of said rotatable body, said second set of grooves defining a plurality of second projections which are arranged at a second predetermined angle with respect to the axis of rotation of said rotatable body, said second projections undergoing the other of compression and elongation when said torque is applied to said rotatable body;

a second coil, said second coil being mounted on a second yoke which juxtaposes said second set of grooves, said second coil being connected with said control circuit;

wherein said first and second sets of projections are magnetically permeable and such that when subject to compression the permeability is reduced and the amount of magnetic flux which passes therethrough is reduced, and when subject to elongation the permeability is increased and the amount of magnetic flux which passes therethrough is increased; and wherein said first and second sets of grooves are defined on different surfaces of said rotatable body.

4. The torque sensor as claimed in claim 3, wherein said control circuit includes a bridge circuit which is operatively connected with said source of alternating current, said first and second coils defining first and second inductances of said bridge circuit, said bridge circuit further including first and second fixed resistances, said first and second fixed resistances being selected to balance said bridge circuit when on torque is applied to said rotatable body.

5. A torque sensor for sensing the torque applied to a rotatable shaft, comprising:

means defining a coaxial bore in said shaft;

means defining a first set of grooves in the wall of said bore;

means defining a second set of grooves on the external peripheral surface of said shaft, said first and second sets of grooves being arranged to define first and second sets of projections therebetween respectively, said first set of projections being arranged to undergo one of compression and elongation when said a torque is applied to said rotatable shaft, said second set of projections being arranged to undergo the other of compression and elongation when said torque is applied to said rotatable shaft;

a stationary shaft, aid stationary shaft being stationary with respect to said rotatable shaft and supported in a manner to extend through said coaxial bore;

a first coil mounted on said stationary shaft, said shaft being formed with a first yoke arrangement, said first yoke arrangement juxtaposing said first set of projections;

a second coil, said second coil being mounted on a second yoke which juxtapose said second set of projections;

a control circuit, said control circuit including a source of alternating current and being operatively connected with said first and second coils.

6. The torque sensor as claimed in claim 5, wherein said control circuit includes a bridge circuit which is operatively connected with said source of alternating current, said first and second coils defining first and second inductances of said bridge circuit, said bridge circuit further including first and second fixed resistances, said first and second fixed resistances being selected to balance said bridge circuit when no torque is applied to said rotatable body.

* * * * *